US012789777B2

(12) United States Patent
Steele et al.

(10) Patent No.: US 12,789,777 B2
(45) Date of Patent: Nov. 10, 2026

(54) BRAKE BACKUP POWER FOR ELECTRICALLY ACTUATED BRAKES OF A PERSONAL TRANSPORTATION VEHICLE AND RELATED METHODS

(71) Applicant: Club Car, LLC, Evans, GA (US)

(72) Inventors: Todd P. Steele, Grovetown, GA (US); John Eldon Robbins, Evans, GA (US); David Schnelle, Martinez, GA (US); Geoffrey David Stewart, Evans, GA (US)

(73) Assignee: Club Car, LLC, Evans, GA (US)

( * ) Notice: Subject to any disclaimer, the term of this patent is extended or adjusted under 35 U.S.C. 154(b) by 0 days.

(21) Appl. No.: 18/953,193

(22) Filed: Nov. 20, 2024

(65) Prior Publication Data

US 2025/0178579 A1 Jun. 5, 2025

Related U.S. Application Data

(60) Provisional application No. 63/604,408, filed on Nov. 30, 2023.

(51) Int. Cl.
*B60T 13/74* (2006.01)
*B60T 8/88* (2006.01)
(Continued)

(52) U.S. Cl.
CPC .............. *B60T 13/74* (2013.01); *B60T 8/885* (2013.01); *B60T 13/741* (2013.01); *B60T 17/22* (2013.01); *B60T 17/221* (2013.01); *B60T 2270/40* (2013.01); *B60T 2270/402* (2013.01); *B60T 2270/414* (2013.01); *F16D 2121/26* (2013.01)

(58) Field of Classification Search
CPC ... B60T 7/12; B60T 7/22; B60T 7/221; B60T 8/885; B60T 13/74; B60T 13/741; B60T 17/22; B60T 17/221; B60T 2270/40; B60T 2270/402; B60T 2270/413; B60T 2270/414; F16D 2121/26
See application file for complete search history.

(56) References Cited

U.S. PATENT DOCUMENTS

| | | | |
|---|---|---|---|
| 2,512,565 | A | 6/1950 | Hallander |
| 6,595,306 | B2 | 7/2003 | Trego et al. |

(Continued)

FOREIGN PATENT DOCUMENTS

| | | | | |
|---|---|---|---|---|
| DE | 19758289 A1 * | 7/1999 | | B60T 13/74 |
| DE | 102021210444 A1 | 3/2023 | | |

(Continued)

*Primary Examiner* — John M Zaleskas
(74) *Attorney, Agent, or Firm* — Womble Bond Dickinson (US) LLP

(57) ABSTRACT

An example method of controlling an electrically released brake of a personal transportation vehicle includes (a) energizing the electrically released brake with a first electrical signal from a first electrical power supply of the personal transportation vehicle to transition the electrically released brake from an engaged position to a disengaged position. In addition, the method includes (b) detecting a fault in the first electrical power supply after (a). Further, the method includes (c) applying a second electrical signal to the electrically released brake in response to (b) to maintain the electrically released brake in the disengaged position.

20 Claims, 7 Drawing Sheets

100

(51) Int. Cl.
*B60T 17/22* (2006.01)
*F16D 121/26* (2012.01)

(56) References Cited

U.S. PATENT DOCUMENTS

| | | | | |
|---|---|---|---|---|
| 7,699,751 | B2 | 4/2010 | Barber et al. | |
| 8,010,271 | B2 | 8/2011 | Harada | |
| 8,381,853 | B2 | 2/2013 | Iwaki et al. | |
| 11,162,584 | B2 | 11/2021 | Sheiblecker et al. | |
| 11,305,746 | B2 | 4/2022 | Hickey | |
| 11,813,211 | B2 | 11/2023 | Raja | |
| 2005/0000763 | A1* | 1/2005 | Haffelder | B60T 7/10 188/162 |
| 2006/0163939 | A1* | 7/2006 | Kuramochi | B60T 8/885 303/122.04 |
| 2009/0114461 | A1 | 5/2009 | Clark | |
| 2009/0146496 | A1* | 6/2009 | Herges | H02J 9/061 307/64 |
| 2017/0166173 | A1* | 6/2017 | Lauffer | B60T 13/662 |
| 2018/0345931 | A1 | 12/2018 | Harries et al. | |
| 2019/0193707 | A1* | 6/2019 | Deljosevic | B60T 7/105 |
| 2020/0171966 | A1* | 6/2020 | Steele | B60L 50/60 |
| 2022/0194344 | A1* | 6/2022 | Tarandek | B60T 13/588 |
| 2022/0266806 | A1* | 8/2022 | King | B60T 8/96 |
| 2024/0149847 | A1* | 5/2024 | Akourtam | B60T 7/04 |
| 2024/0317198 | A1* | 9/2024 | King | B60T 8/171 |
| 2025/0229759 | A1* | 7/2025 | Schnelle | B60T 17/20 |

FOREIGN PATENT DOCUMENTS

| | | | | |
|---|---|---|---|---|
| EP | 4201765 | A1 * | 6/2023 | B60T 8/171 |
| WO | 2019090128 | A1 | 5/2019 | |

* cited by examiner

100

BRAKE BACKUP POWER FOR ELECTRICALLY ACTUATED BRAKES OF A PERSONAL TRANSPORTATION VEHICLE AND RELATED METHODS

CROSS-REFERENCE TO RELATED APPLICATIONS

This application claims priority to and the benefit of U.S. Provisional Patent Application No. 63/604,408 filed Nov. 30, 2023, and entitled "Electronic Brake Backup Power System," the entire contents of which are incorporated by reference for all purposes.

BACKGROUND

This disclosure generally relates to braking systems for vehicles. More specifically, this disclosure relates to electrically actuated braking systems for personal transportation vehicles.

Personal transportation vehicles, such as golf carts, all-terrain vehicles, utility vehicles, and the like can often include electronic propulsion and/or braking. Electrically actuated brakes include braking systems that are electrically engaged or electrically released. Electrically engaged brakes include friction surfaces that may be forced together electromagnetically to provide a braking force. By contrast, electrically released brakes may include a spring mechanism that forces friction surfaces together unless electromagnetically separated.

BRIEF SUMMARY

Some embodiments disclosed herein are directed to a method of controlling an electrically released brake of a personal transportation vehicle. In some embodiments, the method includes (a) energizing the electrically released brake with a first electrical signal from a first electrical power supply of the personal transportation vehicle to transition the electrically released brake from an engaged position to a disengaged position. In addition, the method includes (b) detecting a fault in the first electrical power supply after (a). Further, the method includes (c) applying a second electrical signal to the electrically released brake in response to (b) to maintain the electrically released brake in the disengaged position.

Some embodiments disclosed herein are directed to a personal transportation vehicle. In some embodiments, the personal transportation vehicle includes an electrically released brake that is configured to transition between: a disengaged position in which the electrically released brake is configured to allow a wheel of the personal transportation vehicle to rotate; and an engaged position in which the electrically released brake is configured to prevent the wheel of the personal transportation vehicle to rotate. In addition, the personal transportation vehicle includes a high-voltage electrical power supply that is configured to output a first electrical power signal to the electrically released brake to transition the electrically released brake from the engaged position to the disengaged position. Further, the personal transportation vehicle includes a vehicle control module (VCM) communicatively coupled to the high-voltage electrical power supply that is configured to: detect a fault in the high-voltage electrical power supply; and output a second electrical power signal to the electrically released brake in response to detecting the fault to maintain the electrically released brake in the disengaged position.

Some embodiments disclosed herein are directed to a non-transitory, computer readable medium comprising instructions, which when executed by a processor, cause the processor to: (a) detect a fault in a first electrical power supply that is configured to output a first electrical signal to an electrically released brake of a personal transportation vehicle to transition the electrically released brake from an engaged position to a disengaged position; and (b) output a second electrical signal to the electrically released brake in response to (a) to maintain the electrically released brake in the disengaged position.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those having ordinary skill in the art upon reading the following detailed description, and by referring to the accompanying drawings. It should be appreciated that this disclosure may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various embodiments, reference will now be made to the accompanying drawings in which.

DETAILED DESCRIPTION

Figure 1:
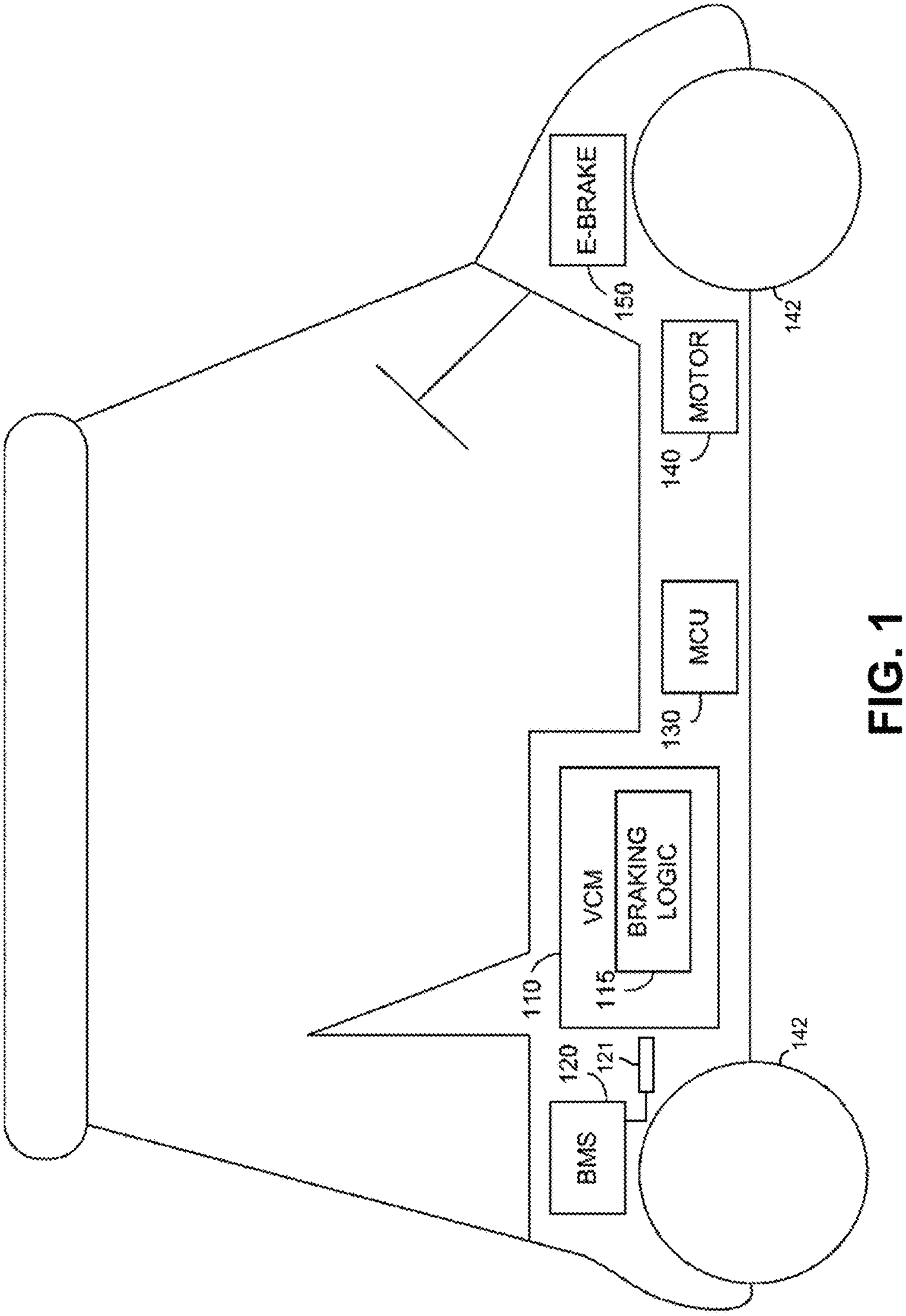
FIG. 1 is a simplified block diagram of a personal transportation vehicle including a back-up power system for an electrically released brake, according to some embodiments disclosed herein.

As previously described, a personal transportation vehicle with electrically released brakes may include a spring mechanism that forces friction surfaces together unless electromagnetically separated. As a result, when a personal transportation vehicle with an electrically released brake experiences a fault in its main power supply, the brake may immediately actuate via the spring mechanism to cause rapid vehicle deceleration. Such rapid deceleration can cause injury to passengers and others, and depending on the circumstances could also result in damage to the personal transportation vehicle itself. Accordingly, embodiments disclosed herein provide for systems and methods for addressing these issues, and for improving the performance and safety of electrically released brakes for a personal transportation vehicle.

Specifically, at least some embodiments disclosed herein include systems and methods for providing backup power to an electrically released brake of a personal transportation vehicle in the event of a fault in a main power system. In some embodiments, the systems and method may detect a fault in a high voltage power system of the vehicle, and in response, provide backup power to the electrically released brake to maintain the brake in a released state. In some embodiments, the method may also include monitoring the speed of the vehicle and removing the backup power to allow the electrically released brake to engage and thereby stop the vehicle when the speed of the vehicle falls below a threshold. Accordingly, the systems and methods disclosed herein may help to prevent a sudden and unanticipated stop of the vehicle via an electrically released brake system in the event of a fault of the vehicle main power system.

In some embodiments, a Vehicle Control Module (VCM) of the vehicle detects the fault in the main power supply and, in response, maintains disengagement of the electrically released brake using a backup power supply. The VCM may also monitor the vehicle speed (e.g., via the motor speed or some other method) and prevent engagement of the brake until the vehicle speed is below a threshold. Once the vehicle speed is below the threshold, the VCM may disconnect the backup power supply from the electrically released brake, thereby allowing the brake to actuate via the spring mechanism to stop the vehicle. Additionally or alternatively, the VCM might partially and/or intermittently allow the brake to engage at higher speed thresholds (that is, higher than the threshold for disconnecting the backup power supply) to prevent the personal transportation vehicle from reaching unwanted increased speeds.

Without being limited to this or any other theory, the delay in applying the electrically released brake may allow a vehicle operator to direct the coasting vehicle to an acceptable location before stopping the vehicle and may allow the vehicle operator (and any other passengers) to prepare themselves for an eventual stopping of the vehicle. If the vehicle includes a mechanically actuated brake, the operator may also use the mechanical brake while the vehicle is coasting to controllably decrease a speed thereof.

Referring now to FIG. 1, a personal transportation vehicle 100 (or "vehicle 100") with a backup power system for an electrically released brake system 150 according to some embodiments disclosed herein. In the example of FIG. 1, the vehicle 100 may comprise a golf cart; however, vehicle 100 may comprise any other suitable personal transportation vehicle in other embodiments, such as an all-terrain vehicle or utility vehicle, among others. The vehicle 100 includes a VCM 110 that is configured to monitor and control one or more (including all) operations of the vehicle 100. The VCM 110 includes braking logic 115 that enables the VCM 110 to provide the backup power to the brake 150 as described herein.

The vehicle 100 also includes a power source 121 and a Battery Management System (BMS) 120 that is configured to provide electrical power from the power source 121 to the other systems of the vehicle 100 during normal operations. The power source 121 may comprise a battery and/or other suitable electrical power source(s) (e.g., capacitor(s), solar panels, etc.). Specifically, vehicle 100 includes a Motor Controller Unit (MCU) 130 that is configured to distribute the electrical power provided from the power source 121 via the BMS 120 to one or more systems of the vehicle 100. In some embodiments, the MCU 130 may distribute high voltage electrical power and low voltage electrical power output from the power source 121 via the BMS 120 to one or more systems of the vehicle 100. In some embodiments, the high voltage electrical power may have a voltage (such as a nominal voltage) in a range from about 48 volts (V) to about 72 V, and the low voltage electrical power may have a voltage of about 12 V. However, other voltages and ranges are contemplated for each of the high voltage electrical power and low voltage electrical power in various embodiments. Ultimately, the high voltage electrical power may have a greater voltage than the low voltage electrical power.

The vehicle 100 includes one or more motors 140 that are configured to provide motive power to the vehicle 100. The one or more motors 140 may comprise electric motors that are driven by an electrical power source (e.g., such as power source 121). Specifically, in some embodiments the MCU 130 may distribute the high voltage electrical power from the power source 121 via the BMS 120 to the motor 140, which in turn drives the vehicle 100 by forcing the rotation of one or more wheels 142 of vehicle 100. In some embodiments, the motor(s) 140 may include or be coupled to a regenerative braking system (not shown) that is configured to recharge the power source 121 when decelerating the vehicle 100 therewith.

The vehicle 100 also includes the previously mentioned electrically released brake 150, which may be referred to herein as an "e-brake" 150 for simplicity. In some embodiments, the e-brake 150 is a spring actuated brake that, during normal operations, typically engages as a parking brake when the vehicle 100 is stopped. Specifically, with reference to FIGS. 2A and 2B, in some embodiments, the e-brake 150 may include an electromagnet 152, a first friction surface or brake pad 156, and one or more biasing members 154 that bias the brake pad 156 toward a second friction surface or rotor 158. The rotor 158 may comprise any suitable surface or component that is rotationally linked to one or more of the wheels 142, so that the rotor 158 may rotate or move along with the wheel 142 when the vehicle 100 is operating (FIG. 1).

Figure 2A:
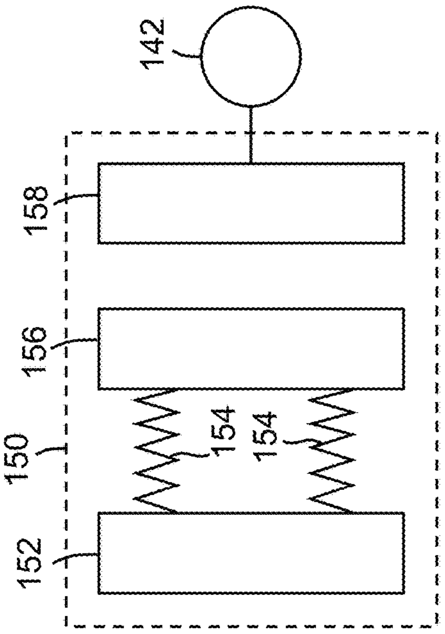
FIG. 2A is schematic block diagram of the electrically released brake of the personal transportation vehicle of FIG. 1 in a disengaged position according to some embodiments disclosed herein.
Figure 2B:
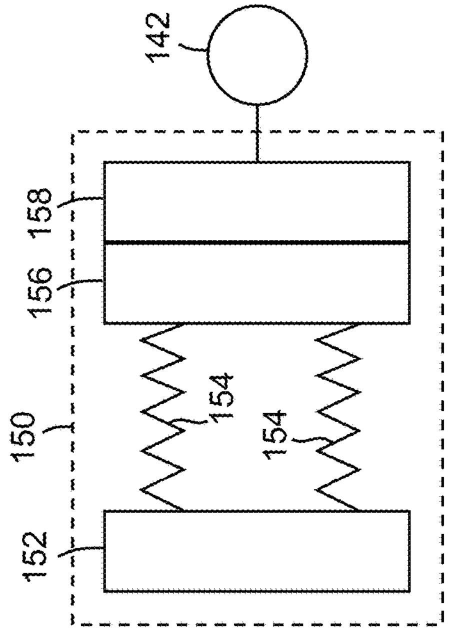
FIG. 2B is a schematic block diagram of the electrically released brake of the personal transportation vehicle of FIG. 1 in an engaged position according to some embodiments disclosed herein.

During operations, the e-brake 150 may be transitioned between a first or disengaged position as shown in FIG. 2A and a second or engaged position as shown in FIG. 2B. In the disengaged position of FIG. 2A, the electromagnet 152 is energized with electric current (that is, the electromagnet 152 is energized with an electrical signal). As a result, the electromagnet 152 exerts an attractive magnetic force on the brake pad 156 (or another magnetic component coupled thereto) so as to pull the brake pad 156 away from the rotor 158 against the biasing force provided by the biasing member(s) 154 and thereby allow the free rotation of the rotor 158 and any wheels 142 mechanically linked or coupled thereto. Conversely, in the engaged position of FIG. 2B, the electromagnet 152 is de-energized or sufficiently less energized so that the attractive magnetic force produced thereby is terminated or sufficiently reduced. In such a state, the biasing members 154 may extend to bias the brake pad 156 into frictional engagement with the rotor 158 thereby slowing or stopping a rotation of the rotor 158 and any wheels 142 mechanically linked thereto.

Referring again to FIG. 1, when the MCU 130 receives a control input to drive the motor 140, the MCU 130 may also transition the e-brake 150 to the disengaged position of FIG. 2A by energizing the electromagnet 152 to allow the vehicle 100 to move. Conversely, when the MCU 130 receives a control input to stop the vehicle 100, the MCU 130 may transition the e-brake 150 to the engaged position of FIG. 2B by de-energizing the electromagnet 152.

In some embodiments, the e-brake 150 is configured such that initially separating the friction surfaces (e.g., the brake pad 156 and rotor 158) to transition the e-brake 150 from the engaged position (FIG. 2B) to the disengaged position (FIG. 2A) requires a greater amount of electrical power, which may be characterized by a higher voltage, than simply maintaining the separation of the friction surfaces in the disengaged position (FIG. 2A). Typically, the electromagnet 152 remains energized to hold the e-brake 150 in the disengaged position of FIG. 2A the entire time the vehicle 100 is in motion. As a result, such a configuration allows for more efficient operation by only requiring higher voltage electrical power input to the e-brake 150 to initially separate the friction surfaces and thereby transition from the engaged position (FIG. 2B) to the disengaged position (FIG. 2A).

Figure 3:
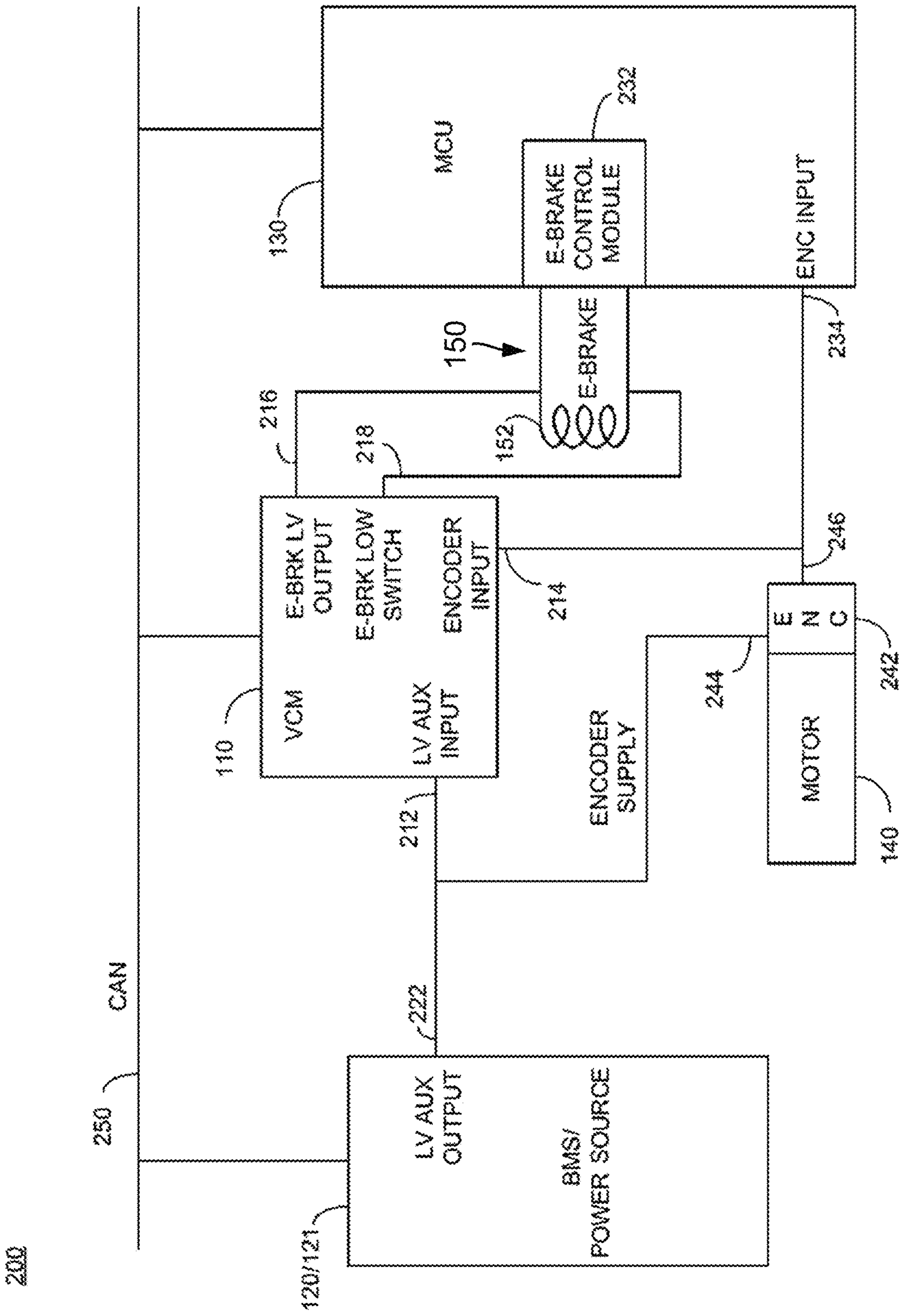
FIG. 3 is a simplified block diagram of components of the electrically released brake system of the vehicle of FIG. 1, according to some embodiments disclosed herein.

Referring now to FIG. 3, a simplified schematic diagram 200 of the backup power system of vehicle 100 (FIG. 1) is shown according to some embodiments disclosed herein. The diagram 200 schematically illustrates the BMS 120 and power source 121 shown in FIG. 1 as a single box, in order to simplify the drawings, and the following description will generally and simply reference to this single box in diagram 200 as the BMS 120/power source 121 in order to simply the text. As a result, it is understood that the functions and features of the BMS 120/power source 121 in the following description may apply to the BMS 120, power source 121, or both in various embodiments. However, it should be appreciated that in some embodiments, the BMS 120 may be separate from and coupled to the power source 121, so that the BMS 120 may distribute electrical power from the power source 121 to one or more other components of the vehicle 100 as previously described. In addition to the BMS 120/power source 121, the diagram 200 also schematically illustrates the VCM 110, the MCU 130, the motor 140, and the e-brake 150 shown in FIG. 1. The VCM 110 may include a low voltage auxiliary input 212, an encoder input 214, an e-brake low voltage output 216, and an e-brake low switch output 218. The e-brake low voltage output 216 and the e-brake low switch output 218 may both be electrically couped to the electromagnet 152 of the e-brake 150. The BMS 120/power source 121 includes a low voltage auxiliary output 222 that provides the low voltage power to the low voltage auxiliary input 212 of the VCM 110.

The MCU 130 includes (or is coupled to) an e-brake control module 232 and an encoder input 234. The e-brake control module 232 may comprise circuitry (including one or more circuits) that is configured to apply a first or high voltage electrical power signal (or more simply a "first or high voltage electrical signal") to the e-brake 150 to thereby transition the e-brake 150 from the engaged position (FIG. 2B) to the disengaged position (FIG. 2A), during normal operations. For example, the e-brake control module 232 may provide sufficient electrical power to the electromagnet 152 (particularly to a coil of the electromagnet 152) of e-brake 150 to create the electromagnetic force sufficient to overcome the bias exerted by the biasing members 154 (FIGS. 2A and 2B) and thereby transition the e-brake 150 to the disengaged position of FIG. 2A. While not specifically shown, the MCU 130 (including the e-brake control module 232) may receive the high voltage electrical power from the BMS 120/power source 121. Thus, the high voltage electrical power signal applied to the e-brake 150 by the MCU 130 (specifically e-brake control module 232) may be equal to or may correspond with the high voltage electrical power provided from the BMS 120/power source 121. Together, the BMS 120/power source 121, MCU 130, and e-brake control module 232 may at least partially define a high-voltage power supply for suppling the high voltage electrical signal to the e-brake 150 during operations.

The motor 140 includes an encoder 242 with a power input 244 and a speed output 246. The encoder power input 244 receives power from the low voltage auxiliary output 222 of the BMS 120/power source 121. For instance, as shown in FIG. 3, the encoder 242 may be directly coupled to the low voltage auxiliary output 222. Alternatively, the encoder 242 may be coupled to the low voltage auxiliary output 222 via the VCM 110 (or another component). Regardless, during operations, the encoder 242 may receive electrical power from the low voltage auxiliary output 222 (or another low voltage auxiliary output on the BMS 120/power source 121). Without being limited to this or any other theory, powering the encoder 242 with the low voltage auxiliary power output from the BMS 120/power source 121 may allow the encoder 242 to continue to receive electrical power in the event of a failure or fault of the high voltage electrical source in the vehicle 10.

The encoder speed output 246 provides a signal that allows the VCM 110 and the MCU 130 to measure the speed of the motor 140 through the encoder input 214 and the encoder input 234, respectively. In some embodiments, the speed of the encoder 242 and the motor 140 are directly proportional (or equal) to the speed of the vehicle 100. Thus, during operations, the VCM 110 and MCU 130 may determine the speed of the vehicle 100 by use of (or based on) the encoder speed output 246.

In some embodiment, the VCM 110 may measure, estimate, calculate, or otherwise determine a speed of the vehicle 10 at least in part by use of other sensors, arrays, controllers, assemblies, etc. For instance, in some embodiments the VCM 110 may determine the speed of the vehicle 10 by use of an inertial measurement unit (IMU) of the vehicle 10. The IMU may be configured to measure or detect one or more of the vehicles 110 acceleration, orientation, angular rate, etc. The IMU may include a plurality of sensors, including accelerometers, gyroscopes, magnetometers, etc. During operations, the VCM 110 may determine the speed of the vehicle 10 based at least in part on an output signal from the IMU (or one or more sensors thereof). Like the encoder 242, the IMU (or one or more of the sensors thereof) may receive electrical power from the low voltage auxiliary output 222 from BMS 120/power source 121 (e.g., either directly or indirectly through another component such as the VMC 110 as previously described). In some embodiments, the VCM 110 may determine the speed of the vehicle 10 via outputs from both the encoder 242 and the IMU.

The VCM 110, the BMS 120/power source 121, and the MCU 130 may also exchange information through a Controller Area Network (CAN) bus 250. In some embodiments, the VCM 110 may detect a fault that would interrupt, restrict, or prevent the high voltage electrical power signal to the e-brake 150 via the MCU 130 (particularly the e-brake control module 232). For instance, in some embodiments, the VCM 110 may detect such a fault through the CAN bus

250. In some embodiments, the MCU 130 may provide a periodic heartbeat/status message to the VCM 110 via the CAN bus 250, and the absence of an expected heartbeat/status message may indicate a fault in the MCU 130 that would prevent the high voltage electrical power signal to the e-brake 150. In some embodiments, the MCU 130 may output an error message to the VCM 110 via the CAN bus 250 to indicate such a fault. In some embodiments, the VCM 110 may detect a fault of the high voltage electrical power signal to the e-brake 150 via a direct measurement of the voltage on an input pin (or other connector) to the VCM 110 from the BMS 120/power source 121. In some embodiments, the VCM 110 may detect a fault of the high voltage electrical power signal to the e-brake 150 via suitable error message (or other signal) from the BMS 120 (or power source 121) via the CAN 250. Still other methods are contemplated for the VCM 110 to detect a fault of the high voltage electrical power signal to the e-brake 150 in various embodiments.

In some embodiments, a fault in the high voltage electrical power signal to the e-brake 150 may cause the e-brake 150 to transition from the disengaged position (FIG. 2B) to the engaged position (FIG. 2A) via biasing members 154. However, according to embodiments disclosed herein, when the VCM 110 detects the fault in the high voltage electrical power signal to the e-brake 150 from MCU 130 (such as via the CAN bus 250 as previously described), the VCM 110 may apply a second or low voltage electrical power signal (or more simply a "second or low voltage electrical signal") to the electromagnet 152 of the e-brake 150 via the e-brake low voltage output 216 and the e-brake low switch output 218. The low voltage electrical power signal may have an insufficient voltage for transitioning the e-brake 150 from the engaged position (FIG. 2B) to the disengaged position (FIG. 2A), but may have a sufficient voltage for holding or maintaining the e-brake 150 in the disengaged position (FIG. 2A). As a result, application of the low voltage electrical signal to e-brake 150 may maintain the e-brake 150 in the disengaged position (FIG. 2A) so as to prevent sudden deceleration of the vehicle 100.

In some embodiments, after the VCM 110 detects the fault in the high voltage electrical power signal to the e-brake 150 and applies the low voltage electrical power signal to the e-brake 150, the VCM 110 may selectively remove or terminate the low voltage electrical power signal to the e-brake 150 so as to allow the e-brake 150 to transition from the disengaged position (FIG. 2A) to the engaged position (FIG. 2B). In some embodiments, selectively removing or terminating the low voltage electrical power signal to the e-brake 150 may comprise entirely preventing the low voltage electrical power signal to the e-brake 150 via a switch or other similar device, or may comprise sufficiently reducing the voltage or current of the low voltage electrical power signal to the e-brake 150 (e.g., to an electrical ground) so that the low voltage electrical power signal is no longer sufficient to maintain the e-brake 150 in the disengaged position (FIG. 2A).

For instance, the VCM 110 may monitor the speed of the vehicle 100 via the encoder speed output 246 (and/or an IMU or other sensor, controller, or assembly) as previously described. In some embodiments, the VCM 110 may monitor the encoder speed output 246 to determine whether the speed of the vehicle 100 has fallen below a threshold. Specifically, without being limited to this or any other theory, the fault in the high voltage electrical power signal to the e-brake 150 may also result in de-energization (or sufficient de-energization) of the motor 140, so that the vehicle 100 will begin to coast and thereby decelerate gradually. The VCM 110 may monitor this gradual deceleration and selectively allow the e-brake 150 to actuate from the disengaged position (FIG. 2A) to the engaged position (FIG. 2B) when the vehicle 100 has slowed to a point that application of the e-brake 150 will not cause a forceful and sudden halt to the vehicle 100. Thus, the threshold of the speed of the vehicle 100 may be sufficiently close to a zero (0) velocity so as to allow the vehicle 100 to perform a more gentle and gradual deceleration following failure of the high voltage electrical power signal to the e-brake 150. In some embodiments, the threshold may be 1 miles per hour (mph) or less, such as 0.75 mph or less, such as 0.5 mph or less, or such as 0.25 mph or less. However, other values are contemplated for the threshold.

In some embodiments, the VCM 110 may initiate or start a timer upon detecting the fault in the high voltage electrical power signal to the e-brake 150. When a predetermined amount of time has elapsed (as indicated by the timer), the VCM 110 may remove or terminate the low voltage electrical power signal to the e-brake 150 so as to allow the e-brake 150 to transition from the disengaged position (FIG. 2A) to the engaged position (FIG. 2B). Without being limited to this or any other theory, delaying the application and engagement of the e-brake 150 following a fault of the high voltage electrical power signal to the e-brake 150 may allow a user (and passengers) of the vehicle 100 to take effective action to prevent injury due to a subsequent stopping of the vehicle. Thus, the predetermined amount of time may be selected to provide such sufficient time to users and/or passengers to take appropriate action. In some embodiments, the predetermined amount of time may comprise 1 minute, 45 seconds, 30 seconds, 15 seconds, or 10 seconds, etc.; however, other time periods are contemplated.

In some embodiments, the VCM 110 may output an alarm (or a suitable signal or command to initiate an alarm) to the user and/or passengers of the vehicle 100 that a failure has occurred and that the vehicle will be coming to a stop. The alarm may be visual (e.g., such as via a message or other graphic on an electronic display of the vehicle 100), audible (e.g., such as a message or tone output from a speaker of the vehicle 100), tactile (e.g., such as a vibration of a steering wheel, pedal, or other component of the vehicle 100), or some combination thereof. Thus, the predetermined amount of time for applying the e-brake 150 (via the timer as previously described), may be selected so as to allow sufficient time for the alarm to be output and for the user and/or passengers to notice the alarm and take suitable appropriate action. In some embodiments, the alarm or message may indicate a countdown to when the e-brake 150 will be applied.

Figure 4:
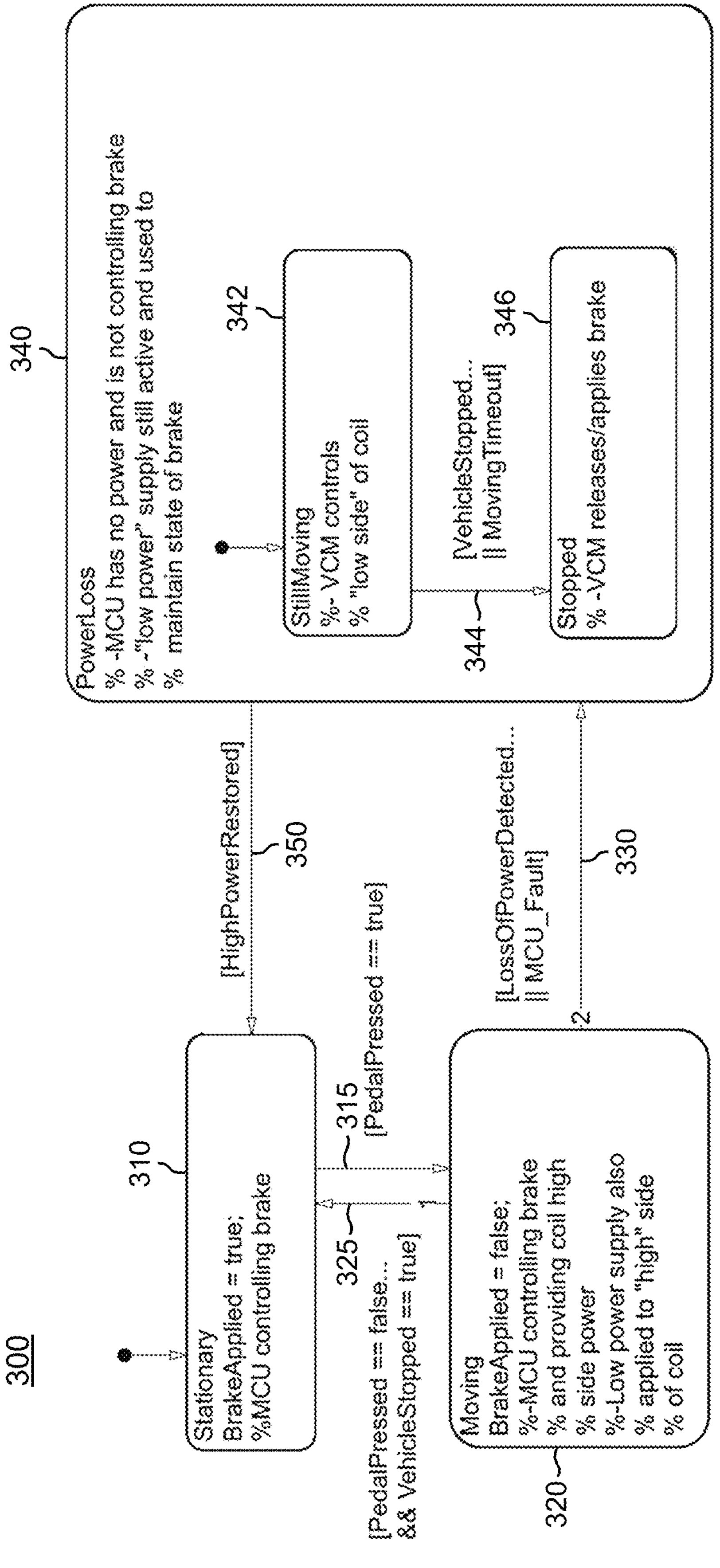
FIG. 4 illustrates a state diagram of the electrically released brake of FIG. 1, according to some embodiments disclosed herein.

Referring now to FIG. 4, a state diagram 300 is shown that illustrates an example of the power system for the electrically released brake 150 of the vehicle 100 in FIG. 1 according to some embodiments disclosed herein. During normal operations, the MCU 130 controls the e-brake 150 via selective application of the high voltage electrical power signal as previously described. When the vehicle is stationary, the e-brake power system is in a stationary state 310 with the e-brake 150 engaged (and therefore in the engaged position of FIG. 2B) to prevent the vehicle 100 from rolling without a user command. When the user provides a command 315 for the vehicle 100 to move (e.g., by pressing the accelerator pedal), the power system transitions to a moving state 320. In the moving state 320, the MCU 130 applies the high voltage electrical power signal to the e-brake 150 to thereby transition the e-brake 150 from the engaged position (FIG. 2B) to the disengaged position (FIG. 2A) and thereby allow the vehicle 100 to move. Additionally or alternatively, the low voltage power supply (e.g., via the e-brake low voltage output 216 and the e-brake low switch output 218 of the VCM 110 as shown in FIG. 3) may provide the low voltage electrical power signal to the e-brake 150 to maintain the e-brake 150 in the disengaged position of FIG. 2A after the MCU 130 applies the high voltage electrical power signal to initially transition the e-brake 150 to the disengaged position (FIG. 2A). Once the user commands the vehicle 100 to stop (e.g., by releasing the accelerator pedal and/or pressing a manual brake pedal) and the vehicle 100 has stopped moving (e.g., as detected via the motor encoder 242), as shown at 325, then the power system transitions back to the stationary state 310 (by de-energizing the e-brake 150).

If the power system detects a fault in the high voltage power supply (e.g., the VCM 110 detects a failure of the high voltage power supply to the e-brake 150 via MCU 130 as previously described), as shown at 330, then the power system transitions to a power loss state 340. In the power loss state 340, the low power voltage supply maintains the e-brake 150 in the disengaged position of FIG. 2A via application of the low voltage electrical power signal while the vehicle 100 is still moving, as shown at moving sub state 342. For example, the VCM 110 may direct low voltage electrical power signal to the electromagnet 152 of the e-brake 150 to thereby maintain the e-brake 150 in the disengaged position (FIG. 2A). Once the power system detects that the vehicle 100 has stopped moving (or that the vehicle speed has fallen below a threshold), as shown at 354, then the power loss state 340 transitions to the stopped substate 346. In the stopped substate 346, the power system terminates (or sufficiently reduces) the electrical power supply (by specifically removing the low voltage electrical power signal) to the e-brake 150 to allow the e-brake 150 to transition to the engaged position (FIG. 2B) and thereby prevent the vehicle 100 from moving further. For example, the VCM 110 may stop delivering low voltage electrical power signal to the electromagnet 152 of the e-brake 150. Once the high voltage power supply is restored, as shown at 350, the power system returns to the stationary state 310 with the high voltage power supply controlling the e-brake 150 via the selective application of the high voltage electrical power signal as previously described.

As should be appreciated, the high voltage electrical power signal applied to the e-brake 150 has a greater voltage than the low voltage electrical power signal applied to the e-brake 150 by the VCM 110. In addition, as also previously described, the electrical power supply necessary to transition the e-brake 150 from the engaged position (FIG. 2B) to the disengaged position (FIG. 2A) may be greater than the amount of power required to maintain the e-brake 150 in the disengaged position (FIG. 2A). Thus, the high voltage electrical power signal may be configured to provide sufficient voltage and power to the e-brake 150 to transition the e-brake 150 from the engaged position of FIG. 2B to the disengaged position of FIG. 2A, while the low voltage electrical power signal may be configured to provide an insufficient voltage and power to the e-brake 150 to transition the e-brake 150 from the engaged position of FIG. 2B to the disengaged position of FIG. 2A. However, the low voltage electrical power signal may be configured to provide sufficient voltage and power to the e-brake 150 to hold or maintain the e-brake 150 in the disengaged position of FIG. 2A.

In some embodiments, the transition 344 from the moving substate 342 to the stopped substate 346 may be triggered by the vehicle speed falling below a threshold as previously described. Additionally, the VCM 110 may trigger the transition 344 after a predetermined amount of time as previously described. For example, the VCM 110 may also notify the user via a suitable alarm or other message that the e-brake 150 will be applied after the predetermined amount of time to provide the user with a warning of the imminent application of the e-brake 150. This may allow the user or other passengers to brace or otherwise prepare for a jolt and avoid the detrimental consequences that often occur when a personal transportation vehicle that is not implementing the techniques presented herein stops abruptly in response to a power loss (e.g., ejection, injury, etc.).

Figure 5:
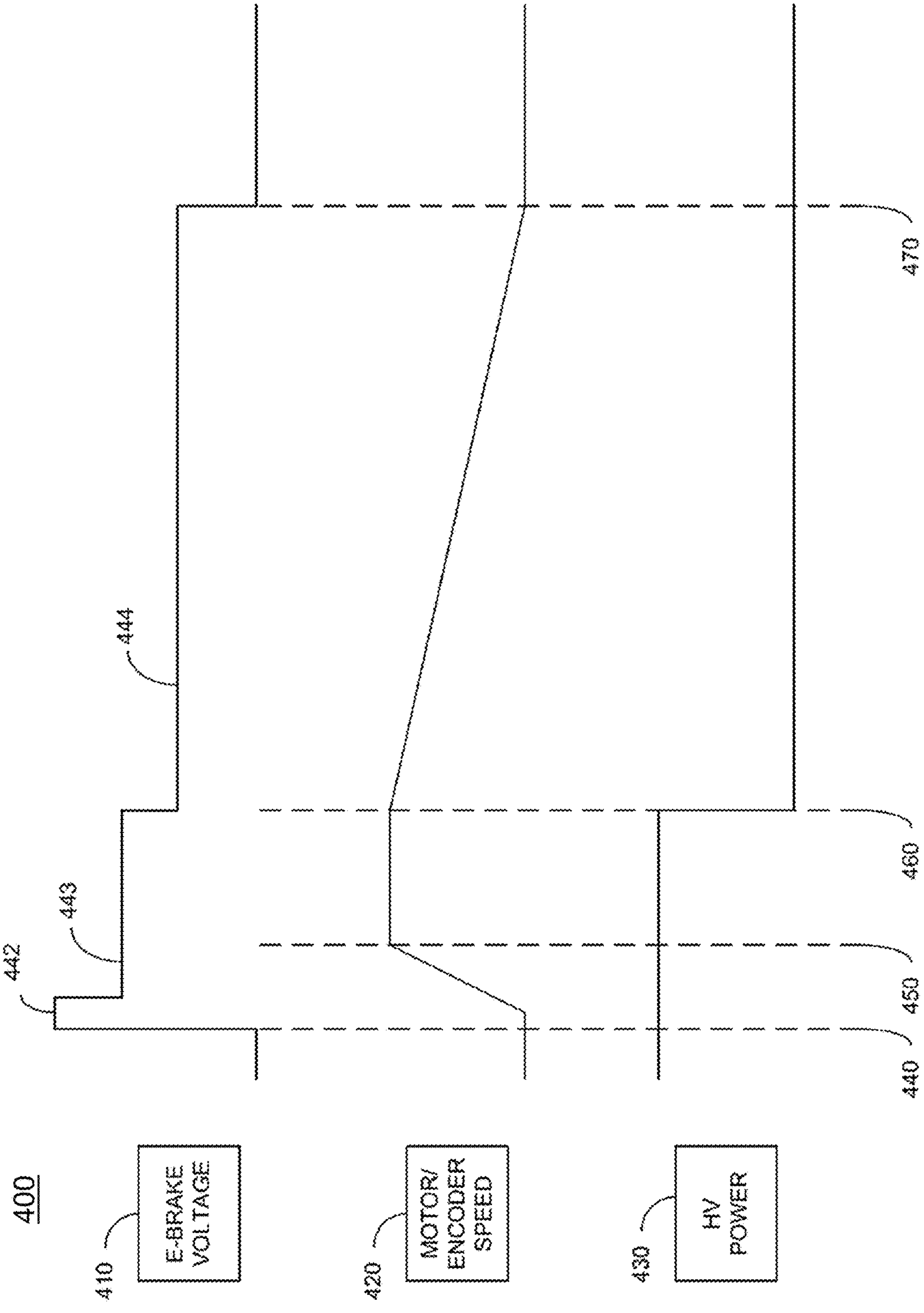
FIG. 5 illustrates a timing diagram illustrating operation of the electrically released brake in a fault mode, according to some embodiments disclosed herein.

Referring now to FIG. 5, a timing diagram 400 is shown that illustrates an example of the e-brake 150 operation during a fault in the high voltage power supply of the vehicle 100 of FIG. 1 according to some embodiments disclosed herein. The timing diagram 400 illustrates and compares the voltage 410 applied to the e-brake 150, the speed 420 of the motor 140/encoder 242, and the high voltage power supply output 430 as the vehicle 100 starts moving, experiences a fault, and gradually slows to a stop. Initially (before time 440 in FIG. 5), the vehicle 100 is stopped with the e-brake 150 voltage 410 at ground to thereby allow the e-brake 150 to transition to the engaged position of FIG. 2B to prevent unwanted motion of vehicle 100. Thus, while the vehicle 100 is stopped, the motor 140/encoder 242 speed 420 is at zero. Additionally, the high voltage power supply output 430 is initially functioning normally and generating a predetermined voltage (e.g., in a range of from about 48 V to about 72 V as previously described) that is available for motive power. The high voltage power supply output 430 may be derived from a high voltage output from the BMS 120/power source 121, and may be applied to the e-brake 150 via the MCU 130 as previously described.

At time 440 in timing diagram 400, the vehicle 100 obtains a command to begin moving. As a result, the vehicle 100 releases the e-brake 150 by setting the e-brake voltage 410 to a high voltage 442 (via a first or high voltage electrical signal as previously described) that transitions the e-brake 150 from the engaged position (FIG. 2B) to the disengaged position (FIG. 2A) as previously described. Once the e-brake 150 is in the disengaged position (FIG. 2A), the vehicle 100 lowers the e-brake voltage 410 to a middle voltage 443 at time 450 to maintain the separation of the friction surfaces in the e-brake 150 (and thus maintains the e-brake 150 in the disengaged position of FIG. 2A). In some embodiment, the middle voltage 443 may be applied to the e-bake 150 via the MCU 130 (specifically the e-brake control module 232) as previously described for the high voltage 442. For instance, with brief reference again to FIG. 3, the e-brake control module 232 may modulate (such as via pulse width modulation) the high voltage electrical power output from the BMS 120/power source 121 to apply either the high voltage 442 or the middle voltage 443 to the e-brake 150.

Referring again to FIG. 5, as the vehicle 100 gains speed, the motor 140/encoder 242 speed 420 rises until a maximum speed is achieved at time 450. In one example, the maximum speed may be determined by the power available to the vehicle motor in relation to the terrain the vehicle is traversing. Alternatively, the maximum speed may be electronically limited for the safety of the vehicle occupants and/or pedestrians around the vehicle.

At time 460, the high voltage power supply output 430 experiences a fault and no longer provides the high voltage power to the vehicle motor. After 460, the high voltage power supply output 430 is no longer functional. As a result, the MCU 130 is no longer able to apply either the high voltage 442 or the middle voltage 443 to the e-brake 150. Rather, the vehicle 100 may provide a lower voltage 444 necessary to maintain the e-brake 150 in the disengaged position of FIG. 2A through the low voltage power supply via the low voltage electrical signal (which may be derived from a low voltage tap into the battery 121 of the vehicle 122). Maintaining the lower voltage 444 on the e-brake voltage 410 prevents the e-brake 150 from transitioning from the disengaged position (FIG. 2A) to the engaged position (FIG. 2B) and allows the vehicle 100 to slowly coast to a stop at 470, as shown by the motor-encoder speed 420 slowly dropping from time 460 to time 470. Once the vehicle stops at time 470, the vehicle 100 engages the e-brake 150 by lowering the e-brake 150 voltage to ground and allowing the biasing member(s) 154 (FIGS. 2A and 2B) in the e-brake 150 to force the friction surfaces (e.g., brake pad 156 and rotor 158) together. In some embodiments, the high voltage 442 may be about 36 V, the middle voltage 443 may be about 24 V, and the low voltage 444 may be about 12 V; however, other values are contemplated.

Figure 6:
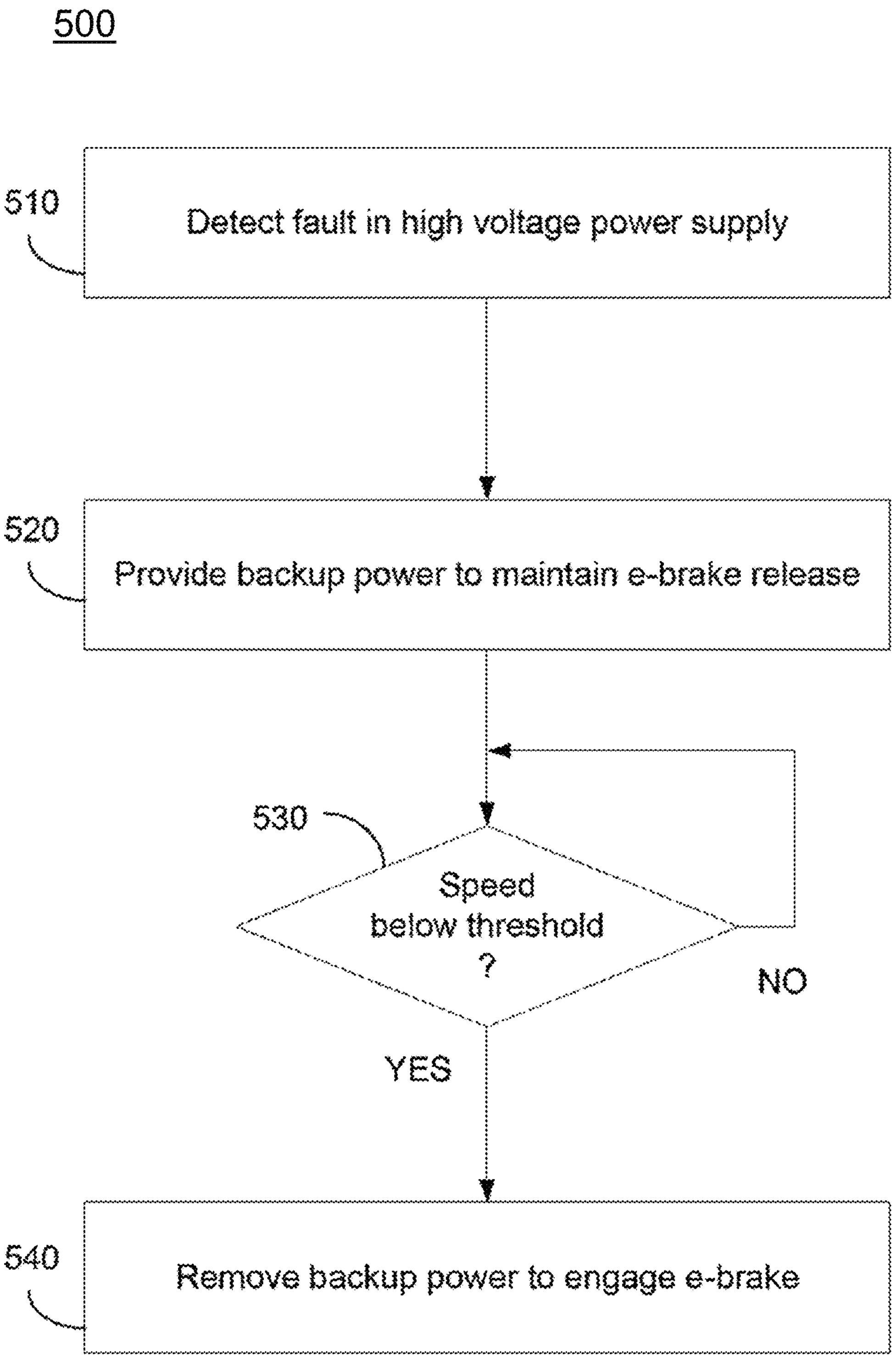
FIG. 6 is a flowchart illustrating an example process that may be performed by a vehicle control module of the personal transportation vehicle of FIG. 1 to provide temporary backup power to the electrically released brake, according to some embodiments disclosed herein.

Referring now to FIG. 6, an example process 500 performed by the VCM 110 of the vehicle 100 to provide temporary backup power to the e-brake 150 is shown according to some embodiments. At block 510, the VCM 110 detects a fault in the high voltage power supply to the e-brake 150. In some embodiments, the VCM 110 may detect the fault via any of the methods previously described. For instance, in some embodiments, the VCM 110 may detect the fault via the BMS 120/power source 121, MCU 130, and/or VCM 110 either directly or through the CAN bus 250 as previously described.

At block 520, the VCM 110 provides backup power to maintain the released state of the e-brake 150. In some embodiments, the VCM 110 obtains the power required to maintain the e-brake 150 from a low voltage power supply (e.g., a low voltage tap on the battery 121) that remains functional after the high voltage power supply provided to e-brake 150 via MCU 130 experiences a fault. In some embodiments, the low voltage power supply may provide sufficient voltage to maintain the disengagement of the e-brake 150 (e.g., so as to maintain the e-brake 150 in the disengaged position of FIG. 2A), but not enough (or insufficient) voltage to initiate the disengagement of the e-brake 150 from the engaged position of FIG. 2B to the disengaged position of FIG. 2A.

At block 530, the VCM 110 monitors the speed of the vehicle 100 until the speed is below a threshold. In some embodiments, the VCM 110 monitors the vehicle speed through the speed of the motor 140 as measured by the encoder 242 (e.g., FIG. 3), an IMU, and/or other sensors, controllers, or assemblies. In some embodiments, the VCM 110 may apply a timer that expires after a predetermined amount of time has elapsed since detection of the fault in the high voltage power supply 230 in addition or in lieu of monitoring the vehicle speed. Once the speed falls below the threshold and/or the timer expires (that is, the timer reaches the predetermined amount of time), the VCM 110 removes the backup power from the e-brake 150, thereby allowing the e-brake 150 to engage at block 540 (e.g., to allow the e-brake 150 to transition from the disengaged position of FIG. 2A to the engaged position of FIG. 2B).

Figure 7:
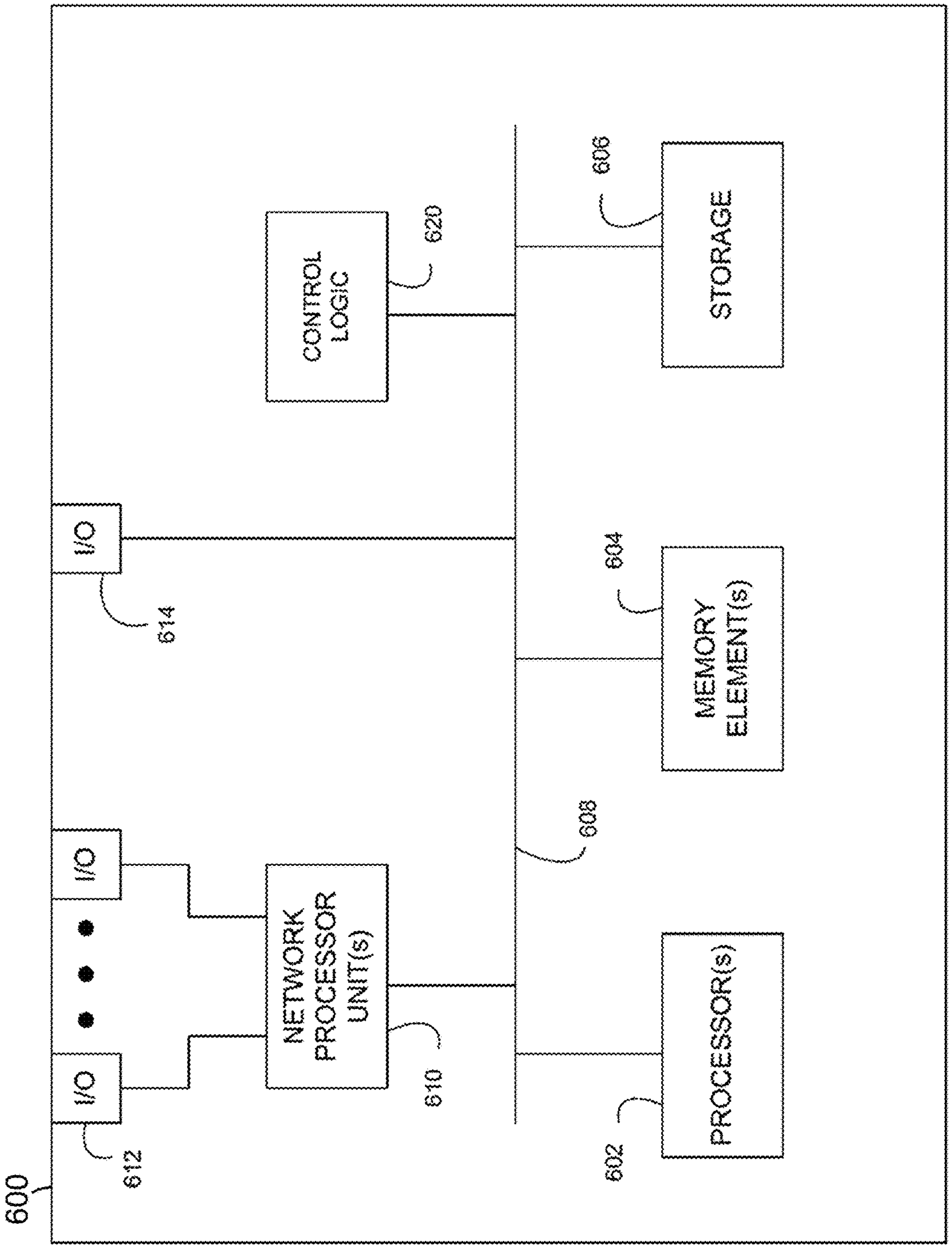
FIG. 7 is a block diagram of a computing device that may be configured to perform one or more of the techniques presented herein, according to some embodiments.

FIG. 7, illustrates a hardware block diagram of a computing device 600 that may perform functions associated with operations discussed herein in connection with the techniques depicted in FIGS. 1-5 according to some embodiments. In some embodiments, a computing device, such as computing device 600 or any combination of computing devices 600, may be configured as any entity/entities (e.g., VCM 110, BMS 120, MCU 130, etc.) as discussed for the techniques depicted in connection with FIGS. 1-5 in order to perform operations of the various techniques discussed herein.

In some embodiments, the computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In some embodiments, instructions associated with logic for computing device 600 can overlap in any manner and are not limited to the specific allocation of instructions and/or operations described herein.

In some embodiments, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. For example, processor(s) 602 can transform an element or an article (e.g., data, information, classical bits, qubits) from one state or thing to another state or thing. Any of potential processing elements, microprocessors, digital signal processor, baseband signal processor, modem, PHY, controllers, systems, managers, logic, and/or machines described herein can be construed as being encompassed within the broad term "processor".

In at least one embodiment, memory element(s) 604 and/or storage 606 is/are configured to store data, information, software, and/or instructions associated with computing device 600, and/or logic configured for memory element (s) 604 and/or storage 606. For example, any logic described herein (e.g., braking logic 115, control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In some embodiments, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600.

In some embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fiber Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fiber Channel ports, CAN bus ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a classical network environment.

I/O interface(s) 614 allow for input and output of data and/or information with other entities that may be connected to computing device 600. For example, I/O interface(s) 614 may provide a connection to external devices such as a keyboard, keypad, a touch screen, accelerator pedal, brake pedal, steering mechanism, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

As explained above and reiterated below, the present disclosure includes, without limitation, the following example implementations.

Clause 1: A method of controlling an electrically released brake of a personal transportation vehicle, the method comprising: (a) energizing the electrically released brake with a first electrical signal from a first electrical power supply of the personal transportation vehicle to transition the electrically released brake from an engaged position to a disengaged position; (b) detecting a fault in the first electrical power supply after (a); and (c) applying a second electrical signal to the electrically released brake in response to (b) to maintain the electrically released brake in the disengaged position.

Clause 2: The method of any of the clauses, wherein the first electrical signal has a greater voltage than the second electrical signal.

Clause 3: The method of any of the clauses, wherein a voltage of the second electrical signal is insufficient to transition the electrically released brake from the engaged position to the disengaged position.

Clause 4: The method of any of the clauses, further comprising: (d) determining that a speed of the personal transportation vehicle has fallen below a threshold after (c); and (e) removing the second electrical signal from the electrically released brake in response to (d) to transition the electrically released brake from the disengaged position to the engaged position and thereby stop the personal transportation vehicle.

Clause 5: The method of any of the clauses, wherein (d) comprises monitoring an output from an encoder coupled to a motor of the personal transportation vehicle to determine the speed of the personal transportation vehicle.

Clause 6: The method of any of the clauses, further comprising: (f) starting a timer after (b); (g) determining that the timer has reached a predetermined amount of time; and (h) removing the second electrical signal from the electrically released brake in response to (g) to transition the electrically released brake from the disengaged position to the engaged position and stop the personal transportation vehicle.

Clause 7: The method of any of the clauses, further comprising: (i) outputting an alarm indicating that the electrically released brake will be transitioned to the engaged position when the predetermined amount of time has elapsed.

Clause 8: The method of any of the clauses, wherein (b) comprises detecting the fault in the first electrical power supply with a vehicle control module (VCM) of the personal transportation vehicle.

Clause 9: The method of any of the clauses, wherein (c) comprises applying the second electrical signal to the electrically released brake with the VCM.

Clause 10: A personal transportation vehicle comprising: an electrically released brake that is configured to transition between: a disengaged position in which the electrically released brake is configured to allow a wheel of the personal transportation vehicle to rotate; and an engaged position in which the electrically released brake is configured to prevent the wheel of the personal transportation vehicle to rotate; a high-voltage electrical power supply that is configured to output a first electrical power signal to the electrically released brake to transition the electrically released brake from the engaged position to the disengaged position; and a vehicle control module (VCM) communicatively coupled to the high-voltage electrical power supply that is configured to: detect a fault in the high-voltage electrical power supply; and output a second electrical power signal to the electrically released brake in response to detecting the fault to maintain the electrically released brake in the disengaged position.

Clause 11: The personal transportation vehicle of any of the clauses, wherein the first electrical power signal has a greater voltage than the second electrical power signal.

Clause 12: The personal transportation vehicle of any of the clauses, wherein the second electrical power signal output from the VCM is insufficient to transition the electrically released brake from the engaged position to the disengaged position.

Clause 13: The personal transportation vehicle of any of the clauses, wherein the VCM is configured to remove the second electrical power signal from the electrically released brake in response to a speed of the personal transportation vehicle falling below a threshold, to thereby transition the electrically released brake from the disengaged position to the engaged position.

Clause 14: The personal transportation vehicle of any of the clauses, further comprising: a motor to drive a rotation of one or more wheels of the personal transportation vehicle; and an encoder coupled to the motor that is configured to detect a rotational speed of the motor, wherein the encoder is configured to receive electrical power from the VCM; and wherein the VCM is coupled to the encoder so that the VCM is configured to detect a speed of the vehicle by use of an output from the encoder.

Clause 15: The personal transportation vehicle of any of the clauses, wherein the VCM is configured to remove the second electrical power signal from the electrically released brake in response to a predetermined amount of time elapsing since detecting the fault.

Clause 16: The personal transportation vehicle of any of the clauses, wherein the VCM is configured to output an alarm indicating that the electrically released brake will be transitioned to the engaged position when the predetermined amount of time has elapsed.

Clause 17: A non-transitory, computer readable medium comprising instructions, which when executed by a processor, cause the processor to: (a) detect a fault in a first electrical power supply that is configured to output a first electrical signal to an electrically released brake of a personal transportation vehicle to transition the electrically released brake from an engaged position to a disengaged position; and (b) output a second electrical signal to the electrically released brake in response to (a) to maintain the electrically released brake in the disengaged position.

Clause 18: The non-transitory, computer readable medium of any of the clauses, wherein the first electrical signal has a greater voltage than the second electrical signal.

Clause 19: The non-transitory, computer readable medium of any of the clauses, wherein a voltage of the second electrical signal is insufficient to transition the electrically released brake from the engaged position to the disengaged position.

Clause 20: The non-transitory, computer readable medium of any of the clauses, wherein the instructions further cause the processor to: (c) determine that a speed of the personal transportation vehicle has fallen below a threshold after (b); and (d) remove the second electrical signal from the electrically released brake in response to (c) to transition the electrically released brake from the disengaged position to the engaged position and thereby stop the personal transportation vehicle.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer readable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Note that herein, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, at least some embodiments disclosed herein maintain disengagement of an electrically released brake using an auxiliary power supply when the main (high voltage) power supply of a vehicle experiences a fault. In the event of a main power loss event, the VCM detects the change and engages control circuitry in order to maintain the brake in the released state by utilizing power from a secondary (low voltage) power supply. This mode of operation is maintained until the VCM obtains data from sensors indicating that the vehicle has reached a speed that is low enough to permit safe engagement of the brake. Once the VCM detects that the vehicle speed in low enough, the VCM activates control circuitry to engage the brake, which stops the vehicle and prevents further movement.

Each example embodiment disclosed herein has been included to present one or more different features. However, all disclosed example embodiments are designed to work together as part of a single larger system or method. The disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The preceding discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the discussion herein and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. Further, when used herein (including in the claims), the words "about," "generally," "substantially," "approximately," and the like, when used in reference to a stated value mean within a range of plus or minus 10% of the stated value.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A method of controlling an electrically released brake of a personal transportation vehicle, the method comprising:

(a) energizing the electrically released brake with a first electrical signal having a first voltage from a first electrical power supply of the personal transportation vehicle to transition the electrically released brake from an engaged position to a disengaged position;

(b) detecting a fault in the first electrical power supply after (a); and (c) applying a second electrical signal having a second voltage that is less than the first voltage and insufficient to transition the electrically released brake from the engaged position to the disengaged position to the electrically released brake in response to (b) to maintain the electrically released brake in the disengaged position.

2. The method of claim 1, further comprising:

(d) determining that a speed of the personal transportation vehicle has fallen below a threshold after (c); and (e) removing the second electrical signal from the electrically released brake in response to (d) to transition the electrically released brake from the disengaged position to the engaged position and thereby stop the personal transportation vehicle.

3. The method of claim 2, wherein (d) comprises monitoring an output from an encoder coupled to a motor of the personal transportation vehicle to determine the speed of the personal transportation vehicle.

4. The method of claim 1, further comprising:

(f) starting a timer after (b);

(g) determining that the timer has reached a predetermined amount of time; and (h) removing the second electrical signal from the electrically released brake in response to (g) to transition the electrically released brake from the disengaged position to the engaged position and stop the personal transportation vehicle.

5. The method of claim 4, further comprising:

(i) outputting an alarm indicating that the electrically released brake will be transitioned to the engaged position when the predetermined amount of time has elapsed.

6. The method of claim 1, wherein (b) comprises detecting the fault in the first electrical power supply with a vehicle control module (VCM) of the personal transportation vehicle.

7. The method of claim 6, wherein (c) comprises applying the second electrical signal to the electrically released brake with the VCM.

8. The method of claim 1, wherein the second voltage is sufficient to maintain the electrically released brake in the disengaged position.

9. The method of claim 1, wherein:

the first electrical signal is directed to the electrically released brake from a first output of the first electrical power supply; and the second electrical signal is directed to the electrically released brake from an auxiliary output of the first electrical power supply.

10. A personal transportation vehicle comprising:

an electrically released brake that is configured to transition between:

a disengaged position in which the electrically released brake is configured to allow a wheel of the personal transportation vehicle to rotate; and an engaged position in which the electrically released brake is configured to prevent the wheel of the personal transportation vehicle to rotate;

a high-voltage electrical power supply that is configured to output a first electrical power signal having a first voltage to the electrically released brake to transition the electrically released brake from the engaged position to the disengaged position; and a vehicle control module (VCM) communicatively coupled to the high-voltage electrical power supply that is configured to:

detect a fault in the high-voltage electrical power supply; and output a second electrical power signal having a second voltage that is less than the first voltage and insufficient to transition the electrically released brake from the engaged position to the disengaged position to the electrically released brake in response to detecting the fault to maintain the electrically released brake in the disengaged position.

11. The personal transportation vehicle of claim 10, wherein the VCM is configured to remove the second electrical power signal from the electrically released brake in response to a speed of the personal transportation vehicle falling below a threshold, to thereby transition the electrically released brake from the disengaged position to the engaged position.

12. The personal transportation vehicle of claim 11, further comprising:

a motor to drive a rotation of one or more wheels of the personal transportation vehicle; and an encoder coupled to the motor that is configured to detect a rotational speed of the motor, wherein the encoder is configured to receive electrical power from the VCM; and wherein the VCM is coupled to the encoder so that the VCM is configured to detect a speed of the vehicle by use of an output from the encoder.

13. The personal transportation vehicle of claim 11, wherein the VCM is configured to remove the second electrical power signal from the electrically released brake in response to a predetermined amount of time elapsing since detecting the fault.

14. The personal transportation vehicle of claim 13, wherein the VCM is configured to output an alarm indicating that the electrically released brake will be transitioned to the engaged position when the predetermined amount of time has elapsed.

15. The personal transportation vehicle of claim 10, wherein the second voltage is sufficient to maintain the electrically released brake in the disengaged position.

16. The personal transportation vehicle of claim 10, wherein:

the first electrical power signal is directed to the electrically released brake from a first output of the high-voltage electrical power supply; and the second electrical power signal is directed to the electrically released brake from an auxiliary output of the high-voltage electrical power supply.

17. A non-transitory, computer readable medium comprising instructions, which when executed by a processor, cause the processor to:

(a) detect a fault in a first electrical power supply that is configured to output a first electrical signal having a first voltage to an electrically released brake of a personal transportation vehicle to transition the electrically released brake from an engaged position to a disengaged position; and (b) output a second electrical signal having a second voltage that is less than the first voltage and insufficient to transition the electrically released brake from the engaged position to the disengaged position to the electrically released brake in response to (a) to maintain the electrically released brake in the disengaged position.

18. The non-transitory, computer readable medium of claim 17, wherein the instructions further cause the processor to:

(c) determine that a speed of the personal transportation vehicle has fallen below a threshold after (b); and (d) remove the second electrical signal from the electrically released brake in response to (c) to transition the electrically released brake from the disengaged position to the engaged position and thereby stop the personal transportation vehicle.

19. The non-transitory, computer readable medium of claim 17, wherein the second voltage is sufficient to maintain the electrically released brake in the disengaged position.

20. The non-transitory, computer readable medium of claim 17, wherein:

the first electrical signal is directed to the electrically released brake from a first output of the first electrical power supply; and the second electrical signal is directed to the electrically released brake from an auxiliary output of the first electrical power supply.

* * * * *